(12) United States Patent
Horii et al.

(10) Patent No.: US 8,090,700 B2
(45) Date of Patent: Jan. 3, 2012

(54) METHOD FOR UPDATING DATABASES

(75) Inventors: Hiroshi Horii, Yamato (JP); Hisashi Miyashita, Machida (JP)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/037,178

(22) Filed: Feb. 26, 2008

(65) Prior Publication Data

US 2009/0216809 A1     Aug. 27, 2009

(51) Int. Cl.
*G06F 17/30* (2006.01)
(52) U.S. Cl. ...................................... 707/705
(58) Field of Classification Search .................. 707/609, 707/769, 705, 713–714, E17.061, E17.062, 707/999.2
See application file for complete search history.

(56) References Cited

U.S. PATENT DOCUMENTS

| 7,120,746 B2 | 10/2006 | Campbell et al. | |
| 2006/0041566 A1* | 2/2006 | Chen et al. | 707/100 |
| 2006/0101044 A1* | 5/2006 | Liu et al. | 707/101 |

OTHER PUBLICATIONS

Bin Liu, Maintaining large update batches by restructuring and grouping, Feb. 2, 2006, ScientDirect, p. 621-639.*
Serge Rielau, Updatable Union All Views in DB2 Uniersal Database Version 8, Sep. 17, 2002, IBM Toronto Lab.*
Sellis et al., "Optimization of Extended Database Query Languages," (1985) SIGMOD 424-436.
Union All Views in DB2 Universal Database Version 8, http://www-128.ibm.com/developerworks/db2/library/techarticle/0209rielau/0209rielau.html, downloaded on Oct. 17, 2007.

* cited by examiner

*Primary Examiner* — Thu-Nguyet Le
(74) *Attorney, Agent, or Firm* — Ryan, Mason & Lewis, LLP

(57) ABSTRACT

Techniques for batch-updating one or more structured query language (SQL) statements in a database are provided. The techniques include identifying a set of one or more data types, wherein the set comprises one or more columns that are each updated, respectively, by a SQL statement, identifying a set of one or more tables, wherein each of the one or more tables are updated, respectively, by a SQL statement, identifying a set of one or more columns used in a WHERE clause of each of one or more SQL statements, and batch-updating the one or more SQL statements, wherein batch-updating comprises creating a UNION ALL view comprising the set of one or more data types, the set of one or more tables and the set of one or more columns used in a WHERE clause, and wherein each SQL statement is mapped to each set of the UNION ALL view.

21 Claims, 3 Drawing Sheets

METHOD FOR UPDATING DATABASES

FIELD OF THE INVENTION

The present invention generally relates to information technology, and, more particularly, to database performance.

BACKGROUND OF THE INVENTION

Challenges exist in updating databases transactionally. There are existing approaches that compose multiple queries or updates to one operation of database to improve database performance. An exemplary existing approach improves performance by specifying values of parameters for multiple times and requesting updates to the database for a single time. However, because batch-update is possible only for a single SQL statement, updates covering multiple tables cannot be batch-updated. SQL statements are the commands used to retrieve or update data of databases. For example, programs send SQL statements to databases and the databases return the results.

SUMMARY OF THE INVENTION

Principles of the present invention provide techniques for updating databases. An exemplary method (which may be computer-implemented) for batch-updating one or more SQL statements in a database, according to one aspect of the invention, can include steps of identifying a set of one or more data types, wherein the set comprises one or more columns that are each updated, respectively, by a SQL statement, identifying a set of one or more tables, wherein each of the one or more tables are updated, respectively, by a SQL statement, identifying a set of one or more columns used in a WHERE clause of each of one or more SQL statements, and batch-updating the one or more SQL statements, wherein batch-updating comprises creating a UNION ALL view comprising the set of one or more data types, the set of one or more tables and the set of one or more columns used in a WHERE clause, and wherein each SQL statement is mapped to each set of the UNION ALL view.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
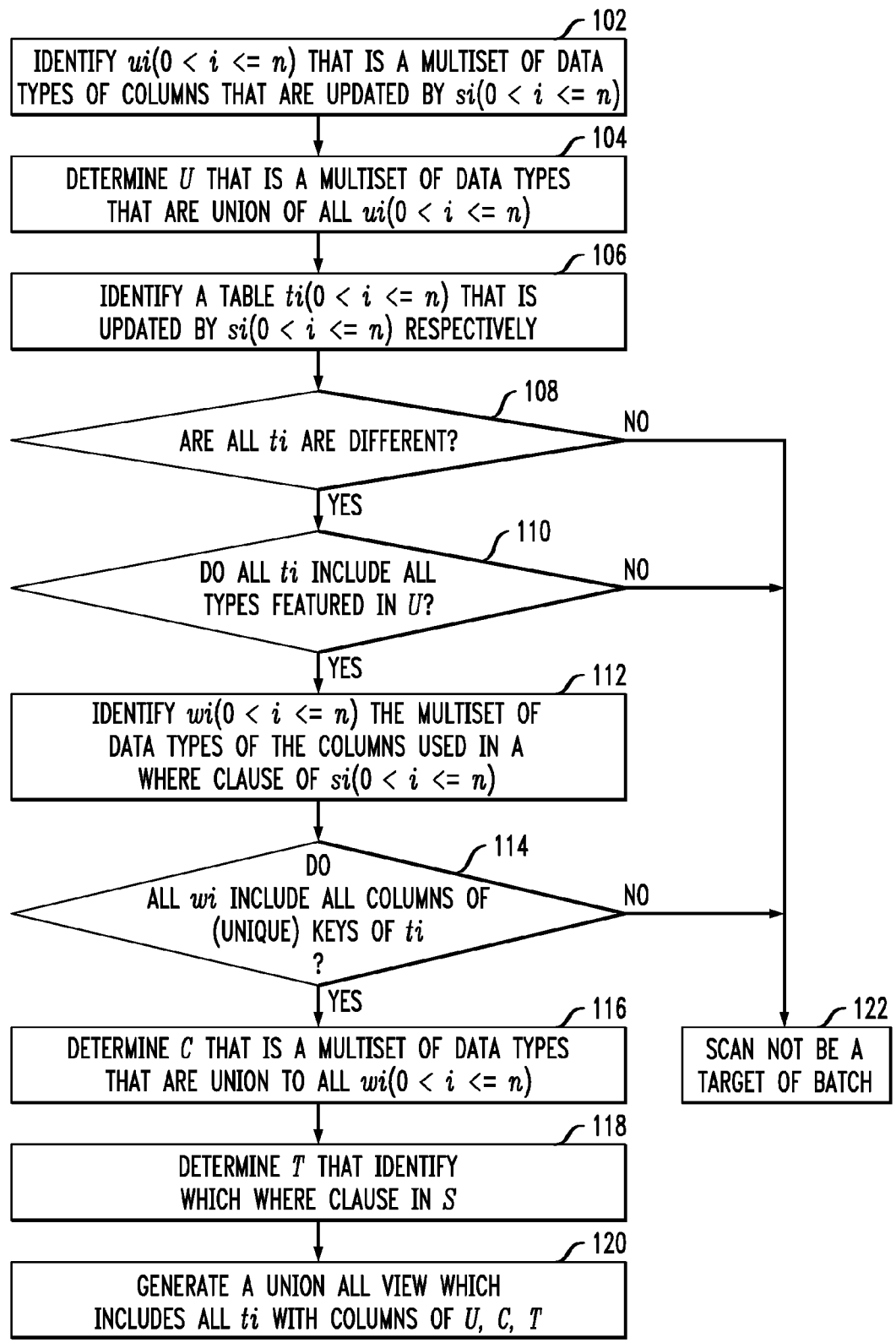
FIG. 1 is a flow diagram illustrating techniques for determining a column and table comprising UNION ALL view, according to an embodiment of the present invention.

Principles of the present invention include a middleware to update multiple tables in a batch (that is, updating multiple database records in a single operation) by using UNION ALL view. As used herein, UNION ALL view is a generic term describing an item that can order one or more results of queries and provide a single result. Also, principles of the invention include updating databases transactionally, including multiple updates in one update to improve database performance.

In recent databases, it has been possible to update multiple tables by one SQL statement, using UNION ALL view composed of two or more tables. However, even when using UNION ALL view, because it is necessary that the columns to be updated have the same number and the same type of data, most update-SQL statements that update different tables respectively cannot be batch, even though these tables are composed of one view by using UNION ALL view.

Principles of the present invention include configuring the UNION ALL view for updating multiple SQL statements that update different tables respectively. In one or more embodiments of the invention, when batch-updating multiple SQL statements S=(s1, s2, . . . , sn) that update columns (u1, u2, . . . , un), the UNION ALL view can be configured, for example, as described below.

$U_i$ ($0 < i \leq n$), that is, a multi-set of data types of columns that are updated by $s_i$ ($0 < i \leq n$) can be identified and U can be a multi-set of data types that are a union of all $u_i$ ($0 < i \leq n$). A table $t_i$ ($0 < i \leq n$) that is updated by $s_i$ ($0 < i \leq n$) respectively is identified, and it is checked that $t_i$ is different from $t_j$ ($0 < j \leq n$, $i \neq j$). If there are tables that are the same, S cannot be composed into one operation. Otherwise, TU can be a set of all $t_i$ ($0 < i \leq n$).

Also, it can be confirmed that all tables $t_i$ ($0 < i \leq n$) in TU include all types that are featured in U. If all types are not included, S cannot be composed into one operation. For every $s_i$ in S, the multi-set of data types of the columns used in a WHERE clause of $s_i$ is identified, and C can be a multi-set of data types that is a union of all of them. For every $s_i$ in S, it is confirmed that the WHERE clause of $s_i$ specifies at most one record. When it is not specified, S cannot be composed into one operation. A record, as used herein, refers to an entry or item in a table of a database. Also, as used herein, a WHERE clause is a part of a SQL statement that describes the conditions to be retrieved or updated.

T can be a column identifying which WHERE clause in S is specified. To update TU with one operation, a UNION ALL view can be created that includes columns of data types U and C, and the column T. Also, the column used in $s_i$ ($0 < i \leq n$) can be mapped to each column of UNION ALL view as described below.

In an illustrative embodiment of the present invention, the columns that are updated by $s_i$ can be mapped to columns of U that have same data types. Also, one can map the columns in U that are not mapped to columns of $t_i$ noted above (that is, the columns that have same data types). Additionally, the columns referred by the WHERE clause of $s_i$ can be mapped to columns of C that have the same data types. The columns referred by the WHERE clause of $s_i$ that are not mapped to columns of C (as noted above) can be mapped to columns that have arbitrary static values. Further, the columns of T can be mapped to the columns that have the identifier of the WHERE clause of si.

In one or more embodiments of the invention, a set of update-SQL statements can be registered in advance. In an exemplary embodiment, a set of the update-SQL statements is S=(s1, s2, ..., sn). Also, a set of tables that are updated by S is TU=(t1, t2, ..., tn). In order to update records of multiple tables by one SQL statement, UNION ALL view is configured. In one or more embodiments of the present invention, UNION ALL view can be updated as follows.

A condition for configuring UNION ALL view can include, for example, that data type of all columns including the UNION ALL view must coincide. A condition for allowing an update can include, for example, that when there is any column by a constant, none of the columns can be updated. A condition for allowing an update can also include, for example, that when there are multiple identical records existing in one UNION ALL VIEW, the UNION ALL VIEW cannot be updated.

FIG. 1 is a flow diagram illustrating techniques for determining a column and table comprising UNION ALL view, according to an embodiment of the present invention. By way of illustration, FIG. 1 depicts the following steps. Step 102 includes identifying ui ($0<i \leq n$), that is a multi-set of data types of columns that are updated by si ($0<i \leq n$). Step 104 includes determining U that is a multi-set of data types that are a union of all ui ($0<i \leq n$). Step 106 includes identifying a table ti ($0<i \leq n$) that is updated by si ($0<i \leq n$) respectively. Step 108 includes determining whether or not all ti are different. If yes, step 108 proceeds to step 110. If no, step 108 proceeds to step 122.

Step 110 includes determining whether of not all ti include all types featured in U. If yes, step 110 proceeds to step 112. If no, step 110 proceeds to step 122. Step 112 includes identifying wi ($0<i \leq n$), the multi-set of data types of the columns used in a WHERE clause of si ($0<i \leq n$). Step 114 includes determining whether or not all wi include all columns of (unique) keys of ti. If yes, step 114 proceeds to step 116. If no, step 114 proceeds to step 122.

Step 116 includes determining C, that is a multi-set of data types that are a union of all wi ($0<i \leq n$). Step 118 includes determining T that identifies which WHERE clause is in S. Step 120 includes generating a UNION ALL view that includes all ti with columns of U, C, and T. Also, as referenced above, step 122 includes determining that S cannot be a target of batch-updating.

In one or more embodiments of the invention, UNION ALL view is configured to perform batch-update in such a way as not to conflict with the conditions outlined above.

As such, an illustrative embodiment of the invention creates UNION ALL view to handle two parameterized update-SQL statements s1 and s2, with batch as follows.

```
s1 = UPDATE T1 SET C11=?, C12=? WHERE K11=?
s2 = UPDATE T2 SET C21=?, C22=?, C23=? WHERE K21=? AND K22=?
```

In addition, T1 can be schemata as follows:

| Name of column | Type of data |
| --- | --- |
| K11 | INTEGER |
| C11 | INTEGER |
| C12 | INTEGER |
| C13 | DOUBLE |
| C14 | DOUBLE |
| C15 | INTEGER |

In addition, T2 can be schemata as follows:

| Name of column | Type of data |
| --- | --- |
| K21 | DOUBLE |
| K22 | DOUBLE |
| C21 | DOUBLE |
| C22 | DOUBLE |
| C23 | INTEGER |
| C24 | INTEGER |

As described herein, ui ($0<i \leq n$), that is, a multi-set of data types of columns that are updated by si ($0<i \leq n$) is identified, and U is a multi-set of data types that are union of all ui ($0<i \leq n$). Data types of columns C11 and C12, which are updated columns by s1 are (INTEGER, INTEGER). Data types of columns C21, C22 and C23, which are updated columns by s2 are (DOUBLE, DOUBLE, INTEGER). Consequently, by the union of (INTEGER, INTEGER) and (DOUBLE, DOUBLE, INTEGER), U=(INTEGER, INTEGER, DOUBLE, DOUBLE) is determined.

A table ti ($0<i \leq n$) that is updated by si ($0<i \leq n$) respectively, is identified, and ti is checked to ensure that it is different from tj ($0<j \leq n$, i≠j). Table T1 and T2 are specified as updated tables by s1 and s2, respectively. Because T1 and T2 are different tables, TU=(T1, T2) is determined by the sum of sets T1 and T2.

Additionally, it can be confirmed that all tables ti ($0<i \leq n$) in TU have all types featured in U. Because T1 and T2 include all columns of U=(INTEGER, INTEGER, DOUBLE, DOUBLE), s1 and s2 become a batch target. For every si in S, the multi-set of data types of the columns used in a WHERE clause of si is identified, and C is a multi-set of data types that are a union of all of them. For every updated SQL statement included in S, the type of columns utilized by the WHERE clause is identified to determine its multiple C set.

From the WHERE clause (WHERE K11=?) of s1, (INTEGER) is specified. From the WHERE clause (WHERE K21=? AND K22=?) of s2, (DOUBLE, DOUBLE) is specified. Consequently, (INTEGER, DOUBLE, DOUBLE) is determined as C, that is, the union of sets of (INTEGER) and (DOUBLE, DOUBLE). For every si in S, it can be confirmed that the WHERE clause of si specifies at most one record.

The columns corresponding to C are (K11, (constant), (constant)) and ((constant), K21, K22) for T1 and T2, respectively. Accordingly, because all main key columns are included, s1 and s2 become a batch target. On the other side, s2 and s3 (as illustrated below) cannot become a batch target because the columns of T1 corresponding to C become (C15, (constant), (constant)), and they may specify multiple records.

```
s3 = UPDATE T1 SET C11=?, C12=? WHERE C15=?
```

In one or more embodiments of the invention, T is a column identifying which WHERE clause in S is specified. An INTEGER type column can be added as T. Further, an identifier of the WHERE clause of s1 is set as "1," and that of the WHERE clause of s2 as "2." To update TU with one operation, one can, for example, create an UNION ALL view that includes columns of data types U and C and the column T, and map from the column used in si ($0 < i \leq n$) to each column of UNION ALL view as follows.

UNION ALL view can be configured with the types of U, C, and T being the columns. The table below shows column names and types of UNION ALL view that can be exemplary configured, and columns of T1 and T2, which can be mapped to each column.

| Name of column | Type | T1 | T2 |
| --- | --- | --- | --- |
| VU1 | INTEGER | C11 | C23 |
| VU2 | INTEGER | C12 | C24 |
| VU3 | DOUBLE | C13 | C21 |
| VU4 | DOUBLE | C14 | C22 |
| VT | INTEGER | 1(constant) | 2(constant) |
| VC1 | INTEGER | K11 | 1(constant) |
| VC2 | DOUBLE | 1.0(constant) | K21 |
| VC3 | DOUBLE | 1.0(constant) | K22 |

When using the configured UNION ALL view, it becomes possible to describe the SQL statement equivalent to when s1 and s2 are batch-updated by one update statement. The below table illustrates a SQL statement with parameters to be registered.

```
UPDATE U_VIEW SET VU1=?, VU2=?, VU3=?, VU4=? WHERE
(VT=? AND VC1=?) OR (VT=? AND VC2=? AND VC3=?)
```

A preferred embodiment of the present invention includes performing batch processing of an updated query, and is described herein. Performing batch processing of an updated query can include, for example, when transactional cache is committed, the values of INTEGER type columns C0 and C1 of records, whose KEY column values in TABLE 1 are 100, are updated to 200 and 300, and the values of INTEGER type columns C2 and C3 of records, whose KEY column values in TABLE 2 are 400, are updated to 500 and 600. As used herein, a KEY column is a column having Y constraint in the table. There is no duplicated value at column in the table.

As such, UNION ALL VIEW can be defined using the SQL shown in the table below.

```
CREATE VIEW SAMPLEVIEW (VIEWKey, VIEWValue0,
VIEWValue1, TABLEID) AS SELECT, Key1, C0, C1, 1 FROM
TABLE1 UNION ALL SELECT Key1, C2, C3, 2 FROM TABLE2
```

Each column in the above table can be mapped, for example, as follows. TableName includes a column for specifying the table to which a record belongs. VIEWKey includes a column used for designating update objects. Also, VIEWValue0 and ViewValue1 include a column to which an update object column of each table is mapped.

Further, using a class such as, for example, PreparedStatement, the SQL statement with parameters (as illustrated in the table below) is registered to a database.

```
UPDATE SAMPLEVIEW SET VIEWVal0=?, VIEWVal1=?
WHERE TABLEID=? AND VIEWKey=?
```

Additionally, sets of values (as illustrated, for example, in the table below) are specified as parameters to be batch-updated.

```
(200, 300, 1, 100)
(500, 600, 2, 400)
```

Figure 2:
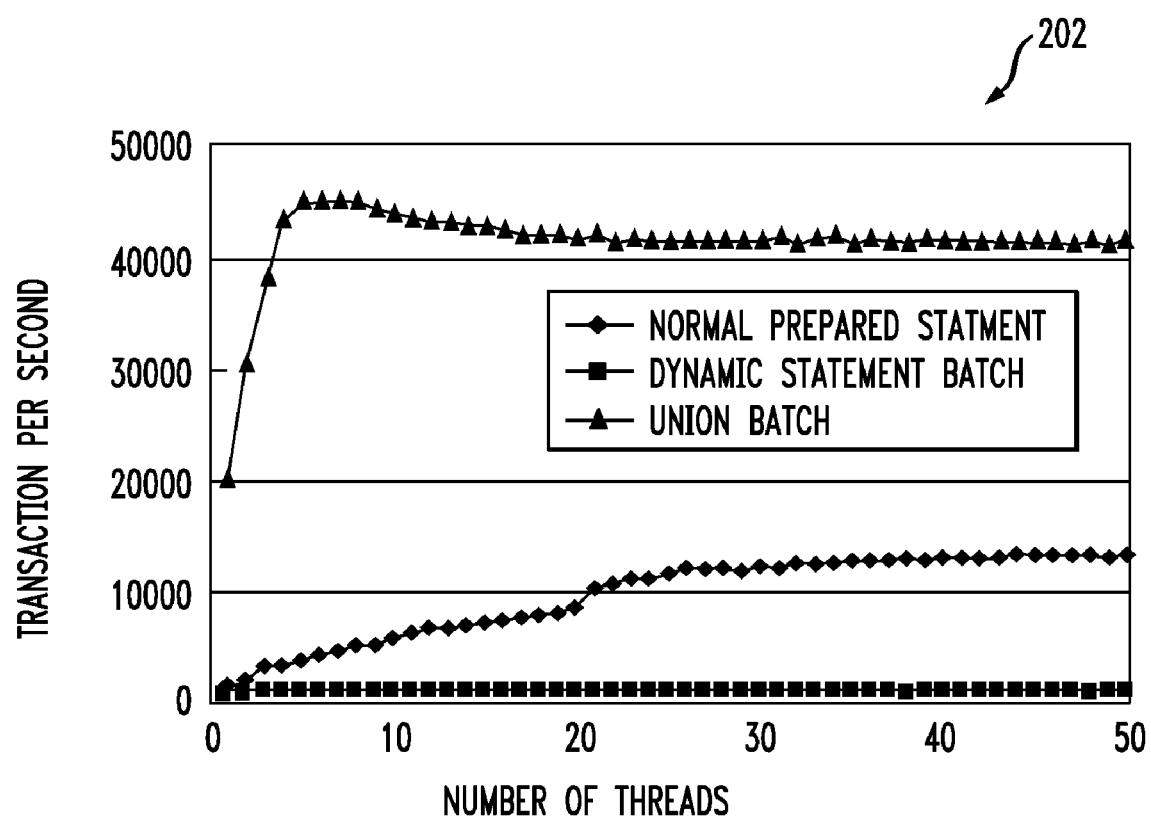
FIG. 2 is a graph illustrating a comparison of performance of batch execution, according to an embodiment of the present invention.

FIG. 2 is a graph 202 illustrating a comparison of performance of batch execution, according to an embodiment of the present invention. Performance when applying the techniques described herein and the performance of batch execution using dynamic SQL and batch execution using normal PreparedStatement have been compared. As such, the number of transactions per second (TPS) were measured when transactions were executed in multiple sleds, such that for five tables, int-type column values were updated for two records at a time. In the case of batch execution using a normal PreparedStatement, five PreparedStatements are generated and two sets of batch update are executed, respectively. FIG. 2 illustrates the results of evaluation of the number of transactions per second versus the number of threads.

While maximum performance using the normal PreparedStatement was 13,112 TPS (46 sleds), maximum performance applying the techniques described herein was 45, 571 TPS (7 sleds). In other words, performance improvement of three and half times was observed.

Figure 3:
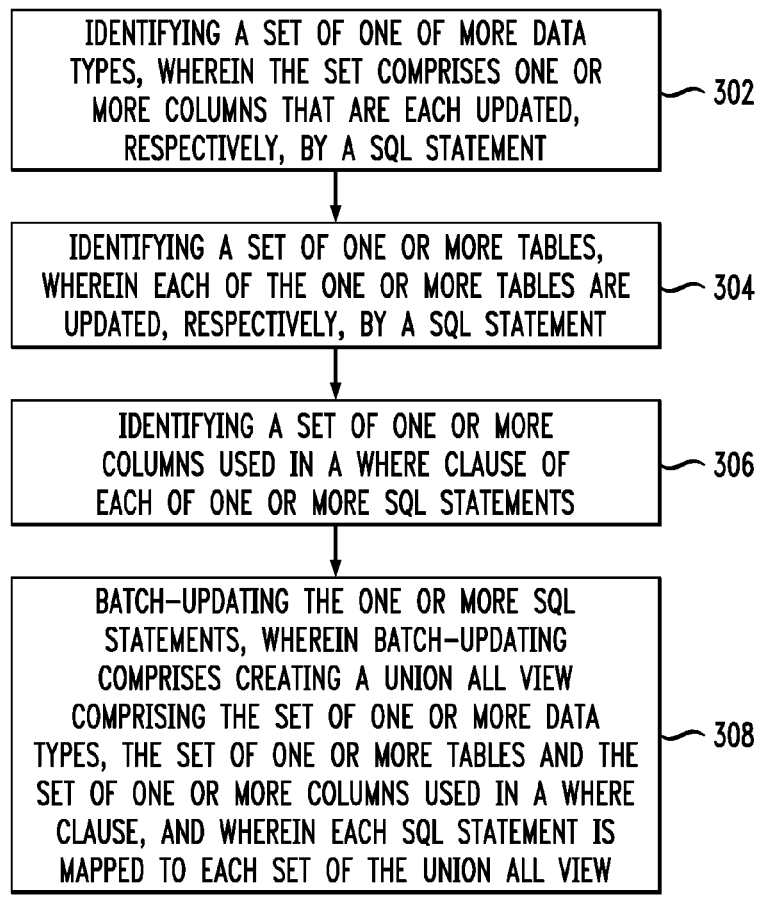
FIG. 3 is a flow diagram illustrating techniques for batch-updating batch-updating one or more SQL statements in a database, according to an embodiment of the present invention.

FIG. 3 is a flow diagram illustrating techniques for batch-updating one or more SQL statements in a database, according to an embodiment of the present invention. Step 302 includes identifying a set of one or more data types, wherein the set comprises one or more columns that are each updated, respectively, by a SQL statement. Step 304 includes identifying a set of one or more tables, wherein each of the one or more tables is updated, respectively, by a SQL statement. Each of the tables can include one or more of the data types. All tables must have all data types to be updated. For example, if table A has INTEGER, INTEGER data types to be updated, and table B has LONG, LONG types to be updated, table A and table B must have INTEGER, INTEGER, LONG, LONG data types. Also, each of the tables is different. For example, to combine two SQL update statements to one batch-update, the two SQL update statements must update different tables.

Step 306 includes identifying a set of one or more columns used in a WHERE clause of each of one or more SQL statements. In each SQL statement, the WHERE clause specifies at most one record. As such, each WHERE clause must contain columns that have UNIQUE constraints or KEY constraints. Step 308 includes batch-updating the one or more SQL statements, wherein batch-updating comprises creating a UNION ALL view comprising the set of one or more data types, the set of one or more tables and the set of one or more columns used in a WHERE clause, and wherein each SQL statement is mapped to each set of the UNION ALL view. Creating a UNION ALL view may include creating a UNION ALL view including two or more parameterized SQL statements.

The techniques depicting in FIG. 3 can also include specifying a set of values as parameters to be batch-updated, as well as registering a set of SQL statements in advance. As used herein, register refers to if a system automatically executes a batch-update with one or more embodiments of the invention, the system memories the target update SQL statements.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 4:
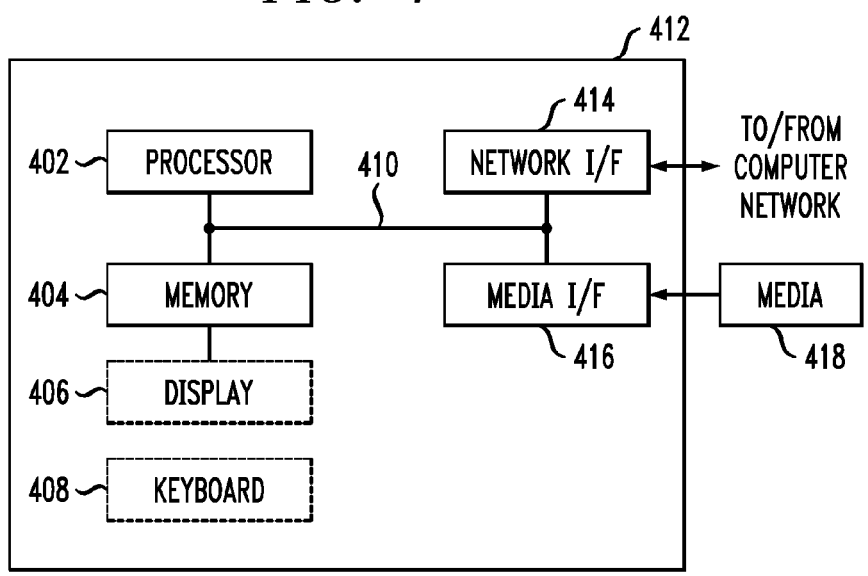
FIG. 4 is a system diagram of an exemplary computer system on which at least one embodiment of the present invention can be implemented.

At present, it is believed that the preferred implementation will make substantial use of software running on a general-purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 404), magnetic tape, a removable computer diskette (for example, media 418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, updating databases transactionally, including multiple updates in one update to improve database performance.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for batch-updating multiple distinct structured query language (SQL) statements in a database, comprising the steps of:
    identifying a set of one or more data types, wherein the set comprises one or more columns that are each updated, respectively, by one of the multiple distinct SQL statements;
    identifying multiple tables, wherein each of the multiple tables is updated, respectively, by one of the multiple distinct SQL statements;
    identifying a set of one or more columns used in a WHERE clause of each of the multiple distinct SQL statements;
    configuring a UNION ALL view for updating the multiple distinct SQL statements; and
    batch-updating the multiple distinct SQL statements, wherein the multiple distinct SQL statements comprise two or more distinct SQL statements, wherein each distinct SQL statement updates a unique table with a unique combination of SET and WHERE clauses and includes a WHERE clause that specifies a record that is unique from each record specified by each WHERE clause in the one or more other distinct SQL statements, wherein batch-updating comprises using the UNION ALL view comprising the set of one or more data types, the set of one or more tables and the set of one or more columns used in a WHERE clause, and wherein each distinct SQL statement is mapped to each set of the UNION ALL view.

2. The method of claim 1, wherein each of the one or more tables comprise one or more of the one or more data types.

3. The method of claim 1, wherein in each SQL statement, the WHERE clause specifies at most one record.

4. The method of claim 1, wherein creating a UNION ALL view comprises creating a UNION ALL view comprising two or more parameterized SQL statements.

5. The method of claim 1, wherein each of the one or more tables is different.

6. The method of claim 1, further comprising specifying a set of values as parameters to be batch-updated.

7. The method of claim 1, further comprising registering a set of SQL statements in advance.

8. A computer program product comprising a computer readable medium having computer readable program code for batch-updating multiple distinct structured query language (SQL) statements in a database, said computer program product including:
   computer readable program code for identifying a set of one or more data types, wherein the set comprises one or more columns that are each updated, respectively, by one of the multiple distinct SQL statements;
   computer readable program code for identifying multiple tables, wherein each of the multiple tables is updated, respectively, by one of the multiple distinct SQL statements;
   computer readable program code for identifying a set of one or more columns used in a WHERE clause of each of the multiple distinct SQL statements;
   computer readable program code for configuring a UNION ALL view for updating the multiple distinct SQL statements; and
   computer readable program code for batch-updating the multiple distinct SQL statements, wherein the multiple distinct SQL statements comprise two or more distinct SQL statements, wherein each distinct SQL statement updates a unique table with a unique combination of SET and WHERE clauses and includes a WHERE clause that specifies a record that is unique from each record specified by each WHERE clause in the one or more other distinct SQL statements, wherein batch-updating comprises using the UNION ALL view comprising the set of one or more data types, the set of one or more tables and the set of one or more columns used in a WHERE clause, and wherein each distinct SQL statement is mapped to each set of the UNION ALL view.

9. The computer program product of claim 8, wherein each of the one or more tables comprise one or more of the one or more data types.

10. The computer program product of claim 8, wherein in each SQL statement, the WHERE clause specifies at most one record.

11. The computer program product of claim 8, wherein the computer readable code for creating a UNION ALL view comprises:
   computer readable program code for creating a UNION ALL view comprising two or more parameterized SQL statements.

12. The computer program product of claim 8, wherein each of the one or more tables is different.

13. The computer program product of claim 8, further comprising computer readable program code for specifying a set of values as parameters to be batch-updated.

14. The computer program product of claim 8, further comprising computer readable program code for registering a set of SQL statements in advance.

15. An apparatus for batch-updating multiple distinct structured query language (SQL) statements in a database, comprising:
   a memory; and
   at least one processor coupled to said memory and operative to:
      identify a set of one or more data types, wherein the set comprises one or more columns that are each updated, respectively, by one of the multiple distinct SQL statements;
      identify multiple tables, wherein each of the multiple tables is updated, respectively, by one of the multiple distinct SQL statements;
      identify a set of one or more columns used in a WHERE clause of each of the multiple distinct SQL statements;
      configure a UNION ALL view for updating the multiple distinct SQL statements; and
      batch-update the multiple distinct SQL statements, wherein the multiple distinct SQL statements comprise two or more distinct SQL statements, wherein each distinct SQL statement updates a unique table with a unique combination of SET and WHERE clauses and includes a WHERE clause that specifies a record that is unique from each record specified by each WHERE clause in the one or more other distinct SQL statements, wherein batch-updating comprises using the UNION ALL view comprising the set of one or more data types, the set of one or more tables and the set of one or more columns used in a WHERE clause, and wherein each distinct SQL statement is mapped to each set of the UNION ALL view.

16. The apparatus of claim 15, wherein each of the one or more tables comprise one or more of the one or more data types.

17. The apparatus of claim 15, wherein in each SQL statement, the WHERE clause specifies at most one record.

18. The apparatus of claim 15, wherein in creating a UNION ALL view, the at least one processor coupled to said memory is further operative to:
   create a UNION ALL view comprising two or more parameterized SQL statements.

19. The apparatus of claim 15, wherein each of the one or more tables is different.

20. The apparatus of claim 15, wherein the at least one processor coupled to said memory is further operative to:
   specify a set of values as parameters to be batch-updated.

21. The apparatus of claim 15, wherein the at least one processor coupled to said memory is further operative to:
   register a set of SQL statements in advance.

* * * * *